United States Patent [19]

Meeks et al.

[11] 3,971,884

[45] July 27, 1976

[54] ETHYLENE-VINYL ACETATE SILICONE RUBBER ADHERENT LAMINATES AND METHOD OF PRODUCTION

[75] Inventors: Lawrence A. Meeks, Cincinnati; James W. Biggs, Lebanon, both of Ohio

[73] Assignee: National Distillers and Chemical Corporation, New York, N.Y.

[22] Filed: Sept. 12, 1975

[21] Appl. No.: 612,596

[52] U.S. Cl. .................. 174/120 SR; 106/287 S; 174/120 AR; 156/51; 156/315; 156/329; 156/308; 156/326; 264/174; 338/214; 427/118; 427/400; 427/120; 427/407; 428/383; 428/446; 428/391; 428/451
[51] Int. Cl.² .................. H01B 7/00; C09J 5/02; B32B 13/12
[58] Field of Search ............. 156/51, 52, 283, 305, 156/307, 308, 313, 315, 326, 327, 329, 331, 332; 427/117, 118, 120, 203, 204, 302, 333, 337, 340, 387, 344, 400, 409, 407; 428/424, 446, 447, 448, 450, 451, 543, 383, 390, 391; 264/174; 338/214; 174/110 S, 120 SR, 120 AR; 260/448.2 R, 348 SC; 106/287 S, 287 SB

[56] References Cited

UNITED STATES PATENTS

| | | | |
|---|---|---|---|
| 2,523,037 | 9/1950 | Mathes | 427/204 |
| 3,306,800 | 2/1967 | Plueddemann | 156/330 |
| 3,318,717 | 5/1967 | Simpson | 106/287 SB |
| 3,379,607 | 4/1968 | Foster et al. | 428/447 |
| 3,433,891 | 3/1969 | Zysk et al. | 427/120 |
| 3,505,099 | 4/1970 | Neuroth | 428/447 |
| 3,542,585 | 11/1970 | Heit | 428/447 |
| 3,576,024 | 4/1971 | Atwell | 260/448.8 R |
| 3,650,808 | 3/1972 | Gagnon | 428/451 |
| 3,667,993 | 6/1972 | Stevenson | 428/447 |
| 3,799,838 | 3/1974 | Shaw et al. | 156/329 |

*Primary Examiner*—Douglas J. Drummond
*Assistant Examiner*—J. J. Gallagher
*Attorney, Agent, or Firm*—Kenneth D. Tremain

[57] ABSTRACT

Crosslinkable ethylene-vinyl acetate copolymer resins are rendered amenable to forming adherent laminates with crosslinkable silicone rubber by coating the surface of the ethylene-vinyl acetate resin with a solution of a silane or a member of the class of compounds known as polyfunctional monomers prior to adhering the resin to the silicone rubber.

12 Claims, No Drawings

ETHYLENE-VINYL ACETATE SILICONE RUBBER ADHERENT LAMINATES AND METHOD OF PRODUCTION

BACKGROUND OF THE INVENTION

Electrical ignition wires are essentially comprised of a central conductor such as copper wire surrounded by an insulating material. Crosslinked silicone rubber is desirable as the insulating material because it has appropriate electrical insulating properties and provides resistance to degradation by oil, water, heat and atmospheric conditions encountered surrounding an internal combustion engine. Unfortunately the silicone rubber is relatively expensive and the stiffness and tensile strength properties of the crosslinked material on the copper conductor are inadequate for this application.

Ethylene-vinyl acetate resins have appropriate electrical insulating properties for use in ignition wires and have satisfactory mechanical strength properties. Since the ethylene-vinyl acetate resins do not have the same oil, water, heat and oxidative resistance characteristics as the crosslinked silicone rubber, it is apparent that an ignition wire having a central copper conductor surrounded by a crosslinked ethylene-vinyl acetate resin which in turn is surrounded by crosslinked silicone rubber would combine the desirable characteristics of the two polymer materials and overcome the foregoing problems. Unfortunately, the adhesion of crosslinked ethylene-vinyl acetate resins to crosslinked silicone rubber is marginal at best.

Accordingly, it is the object of this invention to provide a method by which the bonding of crosslinked ethylene-vinyl acetate resins to crosslinked silicone rubber is improved so that superior electrical insulated products can be achieved. This and other objects of the invention will become apparent to those skilled in the art from the following detailed description.

SUMMARY OF THE INVENTION

This invention relates to a method of improving the adhesion between crosslinked ethylene-vinyl acetate resins and crosslinked silicone rubbers and to the resulting electrical insulated product. More particularly, the invention relates to a method of improving the bonding of crosslinked ethylene-vinyl acetate to crosslinked silicone rubber by coating the surface of the ethylene-vinyl acetate with a solution of a silane or a member of the class of compounds known as polyfunctional monomers prior to adhering the ethylene-vinyl acetate to the silicone rubber and prior to the crosslinking of the two plastic materials.

DESCRIPTION OF THE PREFERRED EMBODIMENTS

The ethylene-vinyl acetate resins and silicone rubber resin and the crosslinking agents therefor which are used in the present invention are well known in the art. Many such materials are commercially available and the individual identity of these materials does not constitute a feature of the present invention. Accordingly, they need not be described any further here.

In general, the ethylene-vinyl acetate and silicone rubbers are separately compounded with the usual fillers such as carbon black, clay, etc., and an appropriate crosslinking agent such as a peroxide. Layers of the two compounded resins are thereafter placed together or extruded such that one resin compound concentrically surrounds the other resin compound. The composite laminate is then cured by heating, under pressure, to an appropriate temperature at which the crosslinking is initiated.

It has been found that in order to achieve a satisfactory adhesion between the ethylene-vinyl acetate copolymer and the silicone rubber after curing, the interface surface should be coated. This is accomplished by dissolving an adhesion promoting agent in an inert solvent, coating the surface of the ethylene-vinyl acetate or the silicone rubber or both, by painting, spraying, roller coating, dip coating or the like and then evaporating the inert solvent to leave a thin layer of the bonding agent on the surface of the plastic.

The silane adhesion promoting or bonding agents which have been found to be useful in the process of this invention are vinyl tris (beta methoxyethoxy) silane, gamma methacryloxypropyl trimethoxysilane, and the silanes manufactured by Dow Corning identified as Z-6032, Z-6020, Z-6040 and Z-6076 and having the formulas

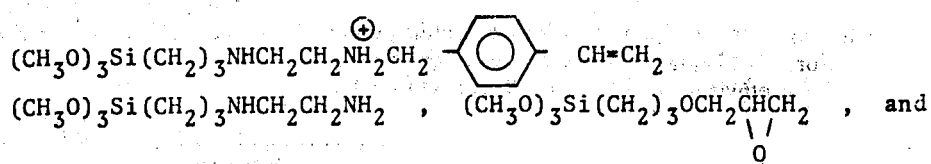

$(CH_3O)_3Si(CH_2)_3Cl$, respectively.

The polyfunctional monomer promoting or bonding agents which have been found useful in the process of this invention are triallyl cyanurate, triallyl isocyanurate, trimethylolpropane trimethacrylate, trimethylolpropane triacrylate, ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, 1,3-butylene glycol dimethacrylate, diethylene glycol diacrylate, triethylene glycol diacrylate, 1,4-butylene glycol diacrylate, allyl methacrylate, diallyl fumarate, divinyl benzene, and triallyl phosphate.

The bonding agent is employed in an amount such that satisfactory adhesion between the silicone rubber and the ethylene-vinyl acetate copolymer is obtained with no effect or minimum effect on the two insulating materials. The amount of the adhesion promoting agent applied is related to the concentration of the agent in the solvent and type of coating process employed to coat the interface surface. Thus, the bonding agent is employed in an amount such that its concentration in the coating solution is about 1 to 80 weight percent, preferably about 1–50 weight percent. Any solvent which is inert with respect to the bonding agent, the ethylene-vinyl acetate resin and the silicone rubber can be employed. In order to facilitate evaporation of the solvent after the surface of the plastic has been coated, it is preferred to use a volatile material as the solvent, i.e., having a boiling point below about 200° C. and most preferably below about 100° C. Solvents useful in this process include alcohols, ketones, esters, hydrocarbon solvents, polyols, glycol ethers and the like. Typical examples of appropriate solvents are methanol, ethanol, acetone, methyl ethyl ketone, pentane hexane and tetrahydrofuran.

Various Examples are set forth below in order to further illustrate the present invention. In these Examples, all parts and percentages are by weight and all temperatures are in degrees Centigrade unless otherwise specified.

EXAMPLE 1

An ethylene-vinyl acetate resin containing 17% vinyl acetate and having a melt index of 1.5 was compounded with 2 parts of vinyl-tris(beta methoxyethoxy)silane and $\alpha,\alpha'$-bis(t-butylperoxy)diisopropyl benzene. A silicone rubber was separately compounded with benzoyl peroxide as the crosslinking agent. Uncured plaques of each resin were then prepared, and the plaques pressed together and cured at 190° C. for 5 minutes. An attempt was made to measure the adhesive strength of one cured laminate on an Instron Peel Strength Tester but the adhesive strength was so poor that the values obtained were not meaningful. Thereafter, cured laminates were tested by hand and the adhesion rated as excellent, good, fair or poor.

EXAMPLE 2

The procedure of Example 1 was repeated except that before the plaques were pressed together, the surface of the ethylene-vinyl acetate plaque was coated with a 10% acetone solution of vinyl-tris(beta methoxyethoxy)silane and the acetone was allowed to evaporate. The cured laminate exhibited improved adhesion with respect to the laminate in which no surface treatment had been effected.

EXAMPLES 3–4

The procedure of Example 2 was repeated twice, once substituting a 10% solution of triallyl isocyanurate in acetone for the silane solution and once substituting a 10% solution of trimethylolpropane trimethacrylate in acetone for the silane solution. The cured laminates exhibited good adhesion between the plies.

EXAMPLE 5

The procedure of Example 2 was repeated substituting a 10% solution of gamma methacryloxypropyl trimethoxysilane in acetone for the solution of vinyl-tris(beta methoxyethoxy)silane. The resulting cured laminate exhibited excellent adhesion.

EXAMPLES 6–7

For comparative purposes, the procedure of Example 2 was repeated twice, once substituting a 10% solution of gamma aminopropyl triethoxysilane in acetone for the vinyl-tris(beta methoxyethoxy)silane solution and once substituting a 10% solution of dimethylsiloxane tetramer in acetone. The resulting cured laminates did not exhibit any improvement in adhesion with respect to the cured laminates compared without any surface treatment.

EXAMPLES 8–31

The procedure of Example 2 was repeated substituting a number of different bonding agents and solvents for the 10% acetone solution of vinyl-tris(beta methoxyethoxy)silane. The results are shown in Table I.

TABLE I

| Ex. No. | Bonding Agent | Solvent | Amount | Adhesion |
| --- | --- | --- | --- | --- |
| 8 | triallyl isocyanurate | acetone | 25% | excellent |
| 9 | trimethylol propane trimethacrylate | acetone | 25% | excellent |
| 10 | gamma methacryloxypropyl trimethoxysilane | acetone | 5% | good |
| 11 | Dow Corning Silane Z-6032 | methanol | 1% | excellent |
| 12 | Dow Corning Silane Z-6032 | methanol | 5% | excellent |
| 13 | Dow Corning Silane Z-6032 | methanol | 10% | excellent |
| 14 | Dow Corning Silane Z-6032 | ethanol | 5% | excellent |
| 15 | Dow Corning Silane Z-6032 | methanol | 50% | excellent |
| 16 | trimethylol propane triacrylate | acetone | 10% | excellent |
| 17 | triallyl cyanurate | acetone | 10% | excellent |
| 18 | ethylene glycol dimethacrylate | acetone | 10% | good |
| 19 | diethylene glycol dimethacrylate | acetone | 10% | good |
| 20 | triethylene glycol dimethacrylate | acetone | 10% | good |
| 21 | tetraethylene glycol dimethacrylate | acetone | 10% | good |
| 22 | polyethylene glycol dimethacrylate | acetone | 10% | good |
| 23 | 1,4-butylene glycol dimethacrylate | acetone | 10% | excellent |
| 24 | 1,3-butylene glycol dimethacrylate | acetone | 10% | excellent |
| 25 | diethylene glycol diacrylate | acetone | 10% | good |
| 26 | triethylene glycol diacrylate | acetone | 10% | good |
| 27 | 1,4-butylene glycol diacrylate | acetone | 10% | excellent |
| 28 | allyl methacrylate | acetone | 10% | good |
| 29 | diallyl fumarate | acetone | 10% | good |
| 30 | divinyl benzene | acetone | 10% | excellent |

TABLE I-continued

| Ex. No. | Bonding Agent | Solvent | Amount | Adhesion |
|---------|---------------|---------|--------|----------|
| 31 | triallyl phosphate | acetone | 10% | good |

Various changes and modifications can be made in the process and products of this invention without departing from the spirit and the scope thereof. The various embodiments set forth herein were for the purpose of further illustrating the invention but were not intended to limit it.

We claim:

1. A method of improving the bonding of crosslinkable ethylene-vinyl acetate with crosslinkable silicone rubber which comprises coating the surface of at least one of said ethylene-vinyl acetate and silicone rubber with a solution of a bonding agent in an inert solvent and evaporating the inert solvent from said surface prior to adhering the ethylene-vinyl acetate to the silicone rubber and crosslinking the resulting laminate, wherein said bonding agent is selected from the group consisting of silanes and polyfunctional monomers.

2. The method of claim 1 wherein said bonding agent is selected from the group consisting of vinyl-tris(beta methoxyethoxy)silane, gamma methacryloxypropyl trimethoxysilane,

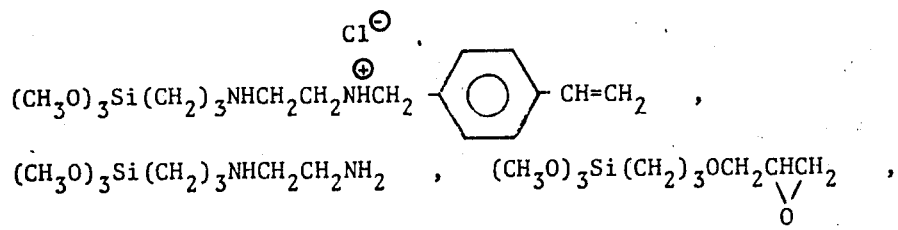

$(CH_3O)_3Si(CH_2)_3Cl$, triallyl cyanurate, triallyl isocyanurate, trimethylolpropane trimethacrylate, trimethylolpropane triacrylate, ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, 1,3-butylene glycol dimethacrylate, diethylene glycol diacrylate, triethylene glycol diacrylate, 1,4-butylene glycol diacrylate, allyl methacrylate, diallyl fumarate, divinyl benzene, and triallyl phosphate.

3. The method of claim 2 wherein said solution contains about 1–80 weight percent of said bonding agent.

4. The method of claim 3 wherein said solution contains about 1–50 weight percent of said bonding agent.

5. The method of claim 4 wherein said bonding agent is selected from the group consisting of triallyl isocyanurate, trimethylolpropane trimethacrylate, gamma methacryloxypropyl trimethoxysilane, triallyl cyanurate, 1,4-butylene glycol dimethacrylate, 1,3-butylene glycol dimethacrylate, 1,4-butylene glycol acrylate and divinyl benzene.

6. A laminate comprising a crosslinked ethylene-vinyl acetate copolymer ply adhered to a ply of crosslinked silicone rubber by a surface bonding agent selected from the group consisting of silane and polyfunctional monomers.

7. The laminate of claim 6 wherein said bonding agent is selected from the group consisting of vinyl-tris(beta methoxyethoxy)silane, gamma methacryloxypropyl trimethoxysilane,

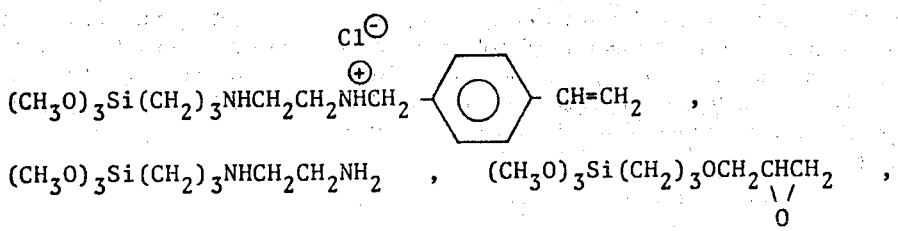

$(CH_3O)_3Si(CH_2)_3Cl$, triallyl cyanurate, triallyl isocyanurate, trimethylolpropane trimethacrylate, trimethylolpropane triacrylate, ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, 1,3-butylene glycol dimethacrylate, diethylene glycol diacrylate, triethylene glycol diacrylate, 1,4-butylene glycol diacrylate, allyl methacrylate, diallyl fumarate, divinyl benzene, and triallyl phosphate.

8. The laminate of claim 7 wherein said bonding agent is selected from the group consisting of triallyl isocyanurate, trimethylolpropane trimethacrylate, gamma methacryloxypropyl trimethoxysilane, triallyl cyanurate, 1,4-butylene glycol dimethacrylate, 1,3-butylene glycol dimethacrylate, 1,4-butylene glycol acrylate and divinyl benzene.

9. An insulated ignition wire comprising a central conductor, a first insulating material surrounding the central conductor and a second insulating material surrounding the first insulated material and bonded thereto by a surface bonding agent, wherein said first insulating material is a crosslinked ethylene-vinyl acetate copolymer, said second insulating material is crosslinked silicone rubber, and said bonding agent is selected from the group consisting of silane and polyfunctional monomers.

10. The insulated ignition wire of claim 9 wherein said bonding agent is selected from the group consisting of vinyl-tris(beta methoxyethoxy)silane, gamma methacryloxypropyl trimethoxysilane,

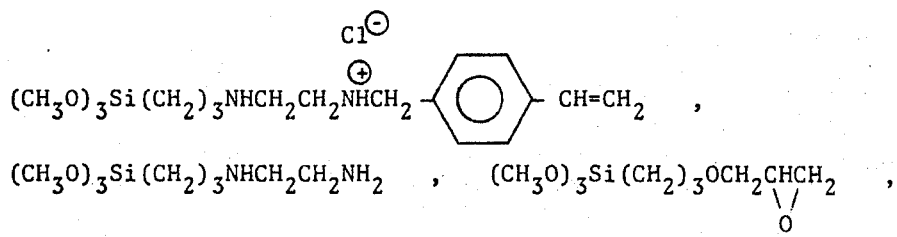

(CH₃O)₃Si(CH₂)₃Cl, triallyl cyanurate, triallyl isocyanurate, trimethylolpropane trimethacrylate, trimethylolpropane triacrylate, ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, 1,3-butylene glycol dimethacrylate, diethylene glycol diacrylate, triethylene glycol diacrylate, 1,4-butylene glycol diacrylate, allyl methacrylate, diallyl fumarate, divinyl benzene, and triallyl phosphate.

11. The insulated ignition wire of claim 10 wherein said central conductor is copper.

12. The insulated ignition wire of claim 10 wherein said bonding agent is selected from the group consisting of triallyl isocyanurate, trimethylolpropane trimethacrylate, gamma methacryloxypropyl trimethoxysilane, triallyl cyanurate, 1,4-butylene glycol dimethacrylate, 1,3-butylene glycol dimethacrylate, 1,4-butylene glycol acrylate and divinyl benzene.

* * * * *